United States Patent [19]

Kujak

[11] Patent Number: 5,653,117
[45] Date of Patent: Aug. 5, 1997

[54] ABSORPTION REFRIGERATION COMPOSITIONS CONTAINING THIOCYANATE, AND ABSORPTION REFRIGERATION APPARATUS

[75] Inventor: Stephen A. Kujak, Onalaska, Wis.

[73] Assignee: Gas Research Institute, Chicago, Ill.

[21] Appl. No.: 632,572

[22] Filed: Apr. 15, 1996

[51] Int. Cl.$^6$ .................................................. F25B 15/00
[52] U.S. Cl. ........................................... 62/112; 252/69
[58] Field of Search ........................... 62/112, 114, 476, 62/101; 252/69

[56] References Cited

U.S. PATENT DOCUMENTS

| | | | |
|---|---|---|---|
| 2,755,170 | 7/1956 | Stubblefield et al. | 23/89 |
| 3,478,530 | 11/1969 | Aronson | 62/112 |
| 3,609,086 | 9/1971 | Modahl et al. | 252/68 |
| 3,831,390 | 8/1974 | Hopkins | 62/476 |
| 4,031,712 | 6/1977 | Costello | 62/483 |
| 4,402,852 | 9/1983 | Young | 252/182 |
| 4,402,907 | 9/1983 | Clark | 422/7 |
| 4,431,563 | 2/1984 | Kramczyk et al. | 252/189 |
| 4,470,272 | 9/1984 | Itoh et al. | 62/474 |
| 4,646,541 | 3/1987 | Reid, Jr. et al. | 62/476 |
| 4,732,008 | 3/1988 | DeVault | 62/79 |
| 4,742,687 | 5/1988 | Reid et al. | 62/112 |
| 4,972,679 | 11/1990 | Petty et al. | 62/238.3 |
| 5,108,638 | 4/1992 | Iizuka et al. | 252/69 |
| 5,186,009 | 2/1993 | Rockenfeller | 62/112 |
| 5,284,029 | 2/1994 | Keuper et al. | 62/476 |

*Primary Examiner*—William Doerrler
*Attorney, Agent, or Firm*—McAndrews, Held & Malloy, Ltd.

[57] ABSTRACT

A refrigerant/absorbent composition is disclosed which comprises an aqueous solution of at least one lithium halide, at least one zinc halide, and a corrosion inhibiting amount of thiocyanate ion. Also, a method of inhibiting corrosion of the metallic parts of an absorption heat transfer machine by adding a thiocyanate compound to a refrigerant/absorbent composition is disclosed. Further disclosed is a triple-effect absorption heat transfer machine having a working fluid in contact with metallic parts, said working fluid comprising a corrosion inhibiting amount of at least one thiocyanate salt.

16 Claims, 1 Drawing Sheet

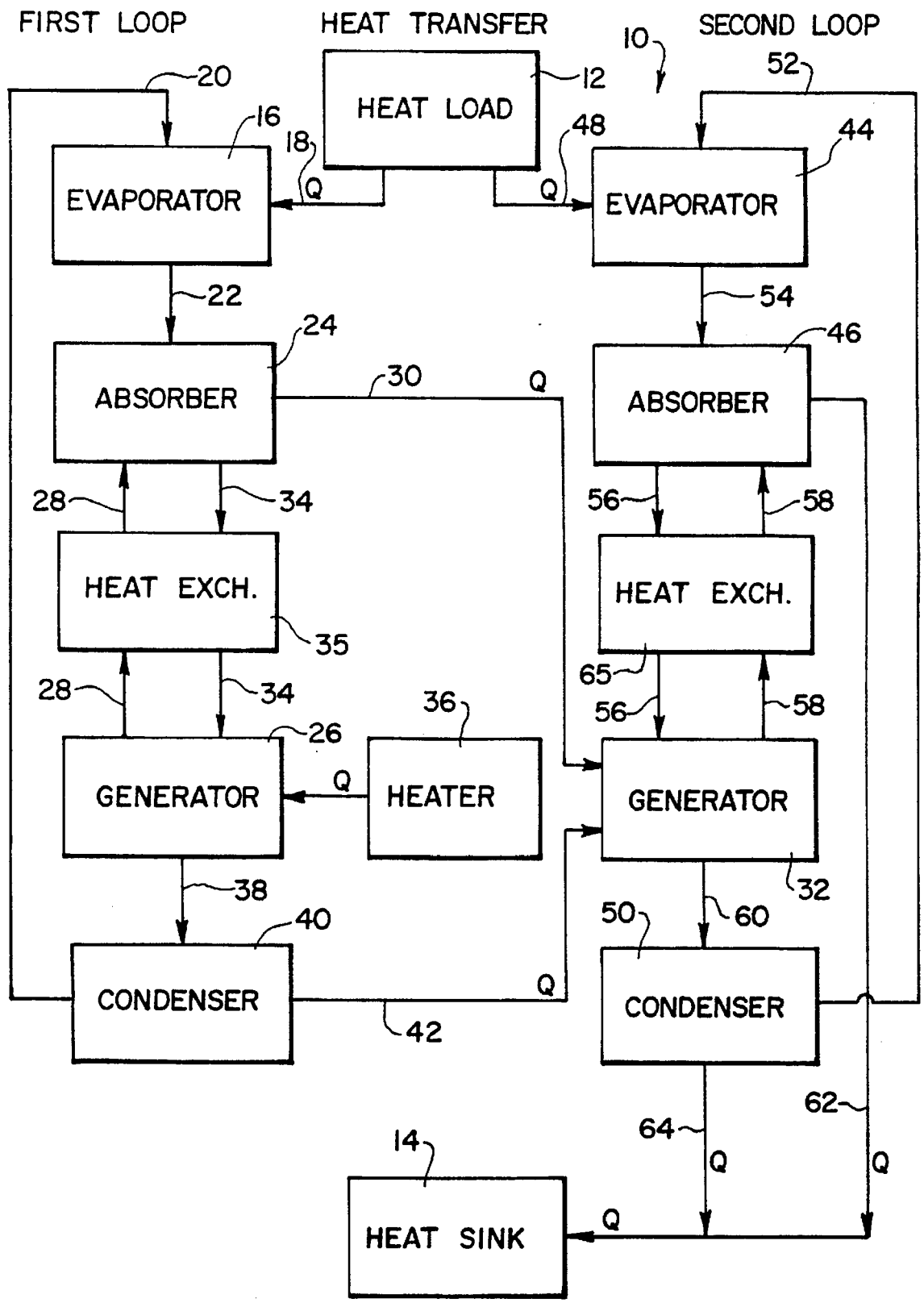

1

ABSORPTION REFRIGERATION COMPOSITIONS CONTAINING THIOCYANATE, AND ABSORPTION REFRIGERATION APPARATUS

FIELD OF THE INVENTION

This invention relates generally to refrigerant/absorbent compositions. More particularly, the invention relates to such compositions which contain thiocyanate ions. These compositions are less corrosive and form less hydrogen without losing their heat transfer effectiveness. Such compositions can be used, for example, in absorption heat transfer apparatus.

BACKGROUND OF THE INVENTION

Absorption refrigeration, chilling, heat pump, energy storage, and other heat transferring apparatus employs a refrigerant/absorbent composition to accept heat from a heat load and transfer this heat to a suitable place for rejection. The refrigerant/absorbent composition includes a more-volatile refrigerant component (such as water) and a less-volatile absorbent component (such as a concentrated aqueous salt solution).

A typical refrigeration loop has four basic components—a generator, a condenser, an evaporator, and an absorber. In the operation of this loop, the refrigerant component is distilled out of the refrigerant/absorbent composition in the generator. After this distillation, the absorbent component left behind is removed to the absorber. At the same time, the distilled refrigerant vapor moves to the condenser where it condenses and sheds heat. The refrigerant liquid then proceeds to the evaporator which is in contact with the heat load for which cooling is desired. The refrigerant absorbs heat and vaporizes once again in the evaporator. The refrigerant vapor is then removed to the absorber where it sheds heat when it is reabsorbed by the absorbent component. The recombined refrigerant/absorbent composition is returned to the generator to complete one cycle. Absorption heat transferring apparatus and its operation are described in greater detail in U.S. Pat. No. 5,284,029, issued Feb. 8, 1994, and assigned to the Gas Research Institute. That patent is incorporated by reference in its entirety here.

In a triple effect absorption apparatus, two of the refrigeration loops described in the preceding paragraph having higher and lower respective temperatures are combined. These two loops operate so that the absorber and condenser of the higher temperature loop are in heat exchange with the generator of the lower temperature loop. Triple effect absorption apparatus and its operation are described in greater detail in U.S. Pat. No. 4,732,008. That patent is hereby incorporated by reference in its entirety into the present disclosure.

The higher temperature loop of the triple-effect absorption apparatus operates in much the same fashion as a conventional single-effect refrigeration loop, except that the condenser and absorber operate at a much higher temperatures than the corresponding components of the lower temperature loop. The two refrigeration loops of the triple-effect apparatus typically contain different refrigerant/absorbent compositions which are independently selected for the particular conditions of one loop.

One refrigerant/absorbent composition frequently used in absorption heat transferring apparatus is a concentrated aqueous composition of lithium bromide (and sometimes other water-soluble salts) as the absorbent, and additional water as the refrigerant. Other ingredients which may be present include lithium chloride and zinc and calcium bromides and chlorides. Such compositions are disclosed generally in U.S. Pat. No. 3,478,530, which is incorporated here by reference.

Typically, water/lithium bromide solutions which do not contain additional ingredients are not practical for the high temperature loop of a triple effect absorption heat transfer machine, due to their solubility and vapor pressure. A single salt aqueous refrigerant/absorbent composition of lithium bromide is not soluble enough to provide a desirably low vapor pressure of the working fluid (about 10 mmJg) at the high absorber temperatures, e.g. about 190°–240° F. (87°–115° C.), required in the high temperature refrigeration loop.

Absorption compositions that can meet these temperature, pressure and solubility requirements include aqueous solutions of lithium, zinc, and calcium bromides and chlorides disclosed generally in U.S. Pat. No. 3,478,530, which is incorporated by reference in its entirety here.

One difficulty which arises from the use of aqueous solutions of bromides, chlorides, and other salts as working fluids is corrosion of the metal parts of the absorption refrigeration apparatus. Corrosion can be a particularly acute problem when the apparatus has steel or copper parts (which are the predominant materials used for piping and heat transfer surfaces). Corrosion decreases the operable lifetime of an apparatus, can reduce its heat transfer capacity, and may erode one or more internal surfaces of an hermetically sealed apparatus to the point of causing leakage of the refrigerant/absorbent composition. Corrosion poses a further problem by forming by-products such as hydrogen gas within the absorption refrigeration system. Hydrogen is a noncondensible gas at the working temperature of the apparatus and thus interferes with the normal operation of the system.

Additives and combinations of additives have been considered before to reduce the corrosive effects of refrigerant/absorbent compositions on metal parts and surfaces. For example, U.S. Pat. No. 4,470,272 proposes molybdates, chromates, nitrates, and tungstates as corrosion-inhibiting additives in lithium bromide-water compositions for triple-effect absorption refrigerators. Although the prior art suggests that these additives display some degree of effectiveness in lessening the corrosion of ferrous metal parts, some or all of these additives do not sufficiently inhibit the corrosive effects of aqueous compositions of lithium and zinc bromides or lithium, zinc and calcium bromides.

The '272 patent also proposes organic inhibitors such as 1,3-diethyl-2-thiourea, thiosinamine, sodium thiocyanate, diphenylthiocarbazide, and 1-acetyl-2-thiourea in lithium bromide-water compositions. The '272 patent states that these inhibitors are suitable for lithium bromide-water compositions in single-effect refrigerators. The '272 patent does not teach the use of these inhibitors in the higher temperature loop of a triple-effect absorption refrigerator, or that these organic inhibitors are effective with compositions other than lithium bromide and water.

SUMMARY OF THE INVENTION

An object of the present invention is to provide a refrigerant/absorbent composition which is inhibited from corroding the metal apparatus in which it is used.

Another object is to provide a refrigerant/absorbent composition which will prolong the operable lifetime of an absorption refrigeration apparatus.

Yet another object of the invention is to provide a method of inhibiting corrosion or formation of hydrogen in an absorption refrigeration apparatus.

Other objects of the invention will be evident to a skilled person who has read the present specification.

The present invention achieves one or more of the foregoing objects, at least to a degree.

One aspect of the present invention is a refrigerant/absorbent composition comprising an aqueous solution of at least one lithium halide and at least one zinc halide, with a corrosion inhibiting amount of at least one thiocyanate salt. Another aspect of the invention is a method of preventing corrosion in an absorption heat transfer machine by adding at least one thiocyanate salt to its working fluid. Yet another aspect of the invention is a triple-effect absorption refrigeration apparatus having a working fluid which contains a corrosion inhibiting amount of at least one thiocyanate salt.

BRIEF DESCRIPTION OF THE DRAWING

The FIGURE is a schematic flow diagram of triple-effect absorption heat transfer machine according to the present invention.

DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

The present invention comprises an aqueous solution of at least one lithium halide, at least one zinc halide, and a corrosion inhibiting amount of thiocyanate ion. The composition may optionally include at least one calcium halide in addition to the lithium and zinc halides. One example of a suitable halide is bromide. Chlorides, fluorides, and iodides are also contemplated.

The refrigerant/absorbent composition of the present invention does hot require any specific amount or weight percentage of water, except that the amount of water must be sufficient to contain an effective amount of thiocyanate ion while enabling the composition to operate effectively within an absorption refrigeration apparatus. For example, water may comprise from about 1% by weight to about 50% by weight, alternatively from about 10% by weight to about 20% by weight, alternatively about 15% by weight of the total composition. (All percentages in this disclosure are expressed as percentage by weight of the total composition, unless otherwise indicated.) These quantities are intended only by way of example and not as limitations on the present invention.

Similarly, the invention does not require any specific amount of lithium halide, zinc halide or other halide salt, nor does it require any specific proportion of any salt to water. It is contemplated that from about 50% to about 99%, alternatively from about 80% to about 90%, alternatively about 85% by weight of halide salts may be used. These quantities are examples of the present invention and are not intended as limitations; the present compositions may have greater or lesser percentages of halide salts. Further, the invention does not require any particular proportion of one halide salt to another halide salt, although it is contemplated that some proportions may be more effective than others. Some embodiments of the invention comprise lithium and zinc bromides in molar ratios of from about 1/1 to about 2/1, alternatively about 1.5/1. Additional embodiments of the invention comprise lithium, zinc and calcium bromides in molar ratios of from about 2/1/0.1 to about 1/1/1, alternatively from about 1.5/1/0.15, to about 1/1/0.7. The present compositions may contain other molar ratios of two or more halide salts without departing from the present invention.

In requiring a corrosion inhibiting amount of thiocyanate ion, the present invention contemplates an amount of thiocyanate ion which inhibits corrosion at least to a degree. For example, the present invention contemplates that a corrosion inhibiting amount can reduce the corrosion rate of a refrigerant/absorbent composition upon a metal surface, as measured in the mils penetration per year of that metal surface, by about 5%. However, the invention is not limited to the use of a particular amount of thiocyanate or to a specific reduction of the rate of corrosion by a refrigerant/absorbent composition, as the present invention contemplates any amount of thiocyanate which inhibits corrosion to any measurable degree.

Thiocyanate ion can be present in an amount substantially less than the amount of the lithium halide present. For example, thiocyanate ion may comprise from about 0.035% by weight to about 5% by weight, alternatively from about 0.09% by weight to about 1% by weight of the total composition. Alternatively, the thiocyanate ion may comprise about 0.2% by weight of the total composition.

A refrigerant/absorbent composition of the present invention may be formed by combining at least the following in any suitable order: water; lithium halide; zinc halide; and an amount of at least one thiocyanate salt which will yield a corrosion inhibiting amount of thiocyanate ion in aqueous solution. (Calcium halide may also be combined.) Specific thiocyanate salts contemplated for the present invention include, but are not limited to, sodium thiocyanate, lithium thiocyanate, potassium thiocyanate, calcium thiocyanate, zinc thiocyanate, and combinations thereof.

By way of example, by not as a limitation, in an embodiment comprising sodium thiocyanate, sodium thiocyanate may comprise from about 0.125% to about 1.25%, alternatively about 0.25%, of the total composition. In an embodiment comprising lithium thiocyanate, lithium thiocyanate may comprise from about 0.1% to about 1%, alternatively about 0.2%, of the total composition. In an embodiment comprising potassium thiocyanate or calcium thiocyanate, potassium thiocyanate or calcium thiocyanate may comprise from about 0.15% to about 1.5%, alternatively about 0.3%, of the total composition. In an embodiment comprising zinc thiocyanate, zinc thiocyanate may comprise from about 0.19% to about 1.9%, alternatively about 0.38%, of the total composition.

A surprising benefit of the present invention is that aqueous solutions of lithium, zinc or calcium halides, which normally cause severe corrosion, are inhibited from corroding the absorption heat exchange apparatus contacting these solutions. Additionally, the invention may broaden the suitability of other aqueous solutions having bromide and chloride salts for absorption refrigeration apparatus, making such aqueous salt solutions acceptable, where the corrosive effects of such solutions previously made them unacceptable or commercially impractical.

While the refrigerant/absorbent compositions of the present invention are well-suited for the high-temperature loop of a triple-effect absorption refrigerator, the refrigerant/absorbent composition of the present invention is also suitable for use in any absorption refrigeration apparatus (single-effect, double-effect, triple-effect or others) for which aqueous salt solutions are useful working fluids. The refrigerant/absorbent composition of the present invention is suitable for use in an apparatus having parts made of steel, copper or other metal. It is conceived that the invention will enable the manufacturers of absorption refrigeration apparatus to construct such apparatus from carbon steels or less expensive stainless steels, thereby reducing the cost of materials and fabrication for the apparatus.

Also contemplated as part of the present invention is a triple-effect absorption heat transfer machine which has metallic parts which are normally corroded by halide salts and a working fluid with a corrosion inhibiting amount of thiocyanate ion in contact with those parts. In one embodiment of the invention, the machine has metallic parts made of copper or steel. The absorption heat transfer machines comprise a first refrigeration loop which operates within a first temperature range and a second refrigeration loop which operates within a second temperature range which has a lower maximum temperature than the maximum temperature of the first temperature range. The first refrigeration loop has a working fluid having a corrosion inhibiting amount of at least one thiocyanate salt contained therein.

Referring to the FIGURE, the heat and refrigerant transfers of a triple-effect refrigeration system are illustrated. The order of the components has been rearranged for clarity. The elements of the FIGURE are arranged in three columns. The left column relates to the first refrigeration loop; the center column shows the heat sources and the heat sink; and the right column shows the second refrigeration loop. Either loop may be charged with the refrigerant/absorbent composition of the present invention.

The system 10 is used to transfer heat from the heat load 12 to the heat sink 14. As is well known, this heat transfer can be carried out whether the heat load 12 is at a higher temperature than, a lower temperature than, or the same temperature as the heat sink 14.

Heat from the load 12 enters the first-loop evaporator 16 of the apparatus via the path 18. (All heat transfers to or from one of the refrigeration loops are represented in the FIGURE by the letter Q next to an arrow indicating the direction of transfer.) Either the first-loop evaporator 16 is in direct heat-transfer contact with the heat load 12 or heat exchangers connect the first-loop evaporator 16 and the heat load 12 to accomplish this heat transfer.

The heat entering the first-loop evaporator 16 evaporates the condensed refrigerant vapor which has entered the first-loop evaporator 16 via the path 20. The effluent of the first-loop evaporator 16, which traverses the path 22, is refrigerant vapor which bears the heat from the heat load 12.

The first-loop absorber 24 receives the refrigerant vapor via the path 22 and contacts it with the less-volatile liquid refrigerant component received from the first-loop generator 26 via the paths 28. The resulting absorption of the refrigerant vapor into the less-volatile refrigerant liquid both condenses the vapor, releasing its heat of vaporization, and releases heat of dissolution as the result of the absorption process. The resulting heat is rejected via the path 30 to the second-loop generator 32. The reconstituted composite refrigerant is passed via the paths 34 through the heat exchanger 35 to the first-loop generator 26. The heat exchanger 35 preheats the composite refrigerant traversing the paths 34 before it enters the generator 26, using heat which otherwise would escape from the generator via the less-volatile refrigerant lines 28.

In the generator 26 of the first loop, the composite refrigerant is heated by the heater 36 sufficiently to distill away the more volatile refrigerant vapor, leaving the less volatile constituent of the refrigerant behind. The refrigerant vapor is delivered via the path 38 to the condenser 40. The less volatile constituent of the refrigerant goes to the first-loop absorber 24 via path 28 (as previously described).

In the first-loop condenser 40, the refrigerant vapor entering via the path 38 is condensed. The heat of condensation is rejected from the first loop, and follows the path 42 to the second-loop generator 32. The condensed refrigerant vapor then exits the first-loop condenser 40 via the path 20 and returns to the first-loop evaporator 16 to complete the first-loop cycle.

Thus, in the first loop, heat from the heat load 12 and the heater 36 enters the loop, and heat leaves the loop from the absorber 24 and condenser 40. Apart from any waste heat which is lost, all the heat taken from the heat load 12 and the heater 36 goes to the second-loop generator 32. A heat exchanger is also conventionally provided to transfer heat from the less-volatile refrigerant in the line 28 leaving the generator 26 to the composite refrigerant in the line 34 entering the generator 26.

Referring now to the right side of the FIGURE, the organization of the second refrigerant loop is essentially identical to that of the first refrigerant loop. The primary differences are in the heat inputs and outputs.

The parts of the second loop are a second-loop evaporator 44, a second-loop absorber 46, a second-loop generator 32, and a second-loop condenser 50. These parts are connected in their operative relationship by a refrigerant vapor condensate line 52, a refrigerant vapor line 54, composite refrigerant lines 56, less-volatile refrigerant component lines 58, and a refrigerant vapor line 60. The heat inputs and outputs of the second loop are as follows. The heat required to operate the second-loop generator 32 comes from the first-loop absorber 24 and condenser 40 via the paths 30 and 42, as previously described. Additional heat from the heat load 12 is received in the second-loop evaporator 44 via the path 48. Heat is rejected from the second-loop absorber 46 and condenser 50 via the paths 62 and 64. Although the paths 62 and 64 are shown as merging, it will be appreciated that separate heat sinks 14 can be provided for the second-loop absorber 46 and the condenser 50. In addition, the reconstituted composite refrigerant is passed via the paths 56 through the heat exchanger 65 to the second-loop generator 32. The heat exchanger 65 preheats the composite refrigerant traversing the paths 56 before it enters the generator 32, using heat which otherwise would escape from the generator 32 via the less-volatile refrigerant lines 58.

An unexpected and surprising aspect of the invention is that it inhibits corrosion in a triple-effect absorption refrigerator at a high temperature, for example the temperature range of the high temperature loop of a triple-effect machine. For example, the invention lessens corrosion in a refrigeration loop having a temperature of approximately 120° C. or more.

WORKING EXAMPLES

Example 1

Corrosion inhibition efficacy tests were carried out as follows. These tests determined the corrosion rates for refrigerant/absorbent compositions with and without an added amount of a corrosion inhibitor of the present invention. The corrosion rates were determined by the weight loss of various iron alloy samples exposed to these compositions.

A testing fluid was chosen to approximate the characteristics (particularly the corrosivity) of the working compositions typically employed in the absorption refrigeration art. The testing solution was an aqueous 85 percent solution of lithium and zinc bromides, with a lithium bromide to zinc bromide molar ratio of 1.5:1. One hundred milliliters of this testing solution were placed into each of several Teflon cups. Teflon cups were selected so the test vessels would not interfere with the test.

About 0.2% by weight solution (2000 ppm) of lithium thiocyanate (LiSCN) was added to some of the Teflon cups as an inhibitor. At least one Teflon cup containing each iron alloy received the inhibitor and at least one cup containing each iron alloy, serving as a control, did not receive the inhibitor.

Preweighed samples of various iron alloys were inserted into the Teflon cups containing the testing fluids. The various iron alloys tested were ASTM A36, ASTM A516 Gr. 70, UNS S40900, UNS S43000, UNS S31600, UNS S44735, and UNS N08367. These iron alloys are designated in Table I as A36, A516, 409, 430, 316, 29-4C, and AL6XN, respectively. At least two samples of each iron alloy were placed into each of the Teflon cups. The weight and shape of the iron alloy samples were selected to approximate the surface area to solution volume ratio of a commercial absorption refrigeration machine.

These Teflon cups were placed in 400 milliliter general purpose pressure vessels. The test vessels were sealed, evacuated and placed in an oven at a test temperature of 550° F. (288° C.) for a test period of about 336 hours (two weeks). After this test period, the iron alloy samples were washed off, dried and weighed. The difference in the weights of the samples before and after the testing period were used to calculate the metal corrosion rate of each iron alloy in units of mils penetration per year (MPY). One mil is 25.4 microns, so 1 MPY equals 25.4 microns per year.

The results of the tests are indicated below in Table I.

TABLE I

| | (U.S. units) | |
|---|---|---|
| Iron Alloy | Uninhibited, mils/year | 0.2% LiSCN, mils/yr |
| A36 | 24.4 | 14.0 |
| A516 | 41.4 | 24.5 |
| 409 | 0.16 | 0.13 |
| 430 | 0.64 | 0.0 |
| 316 | 0.34 | 0.10 |
| 29-4C | 0.03 | 0.03 |
| AL6XN | 0.04 | 0.03 |

| | (metric units) | |
|---|---|---|
| Iron Alloy | Uninhibited, microns/yr | 0.2% LiSCN, microns/yr |
| A36 | 620 | 355 |
| A516 | 1052 | 622 |
| 409 | 4.06 | 3.30 |
| 430 | 16.3 | 0.0 |
| 316 | 8.64 | 2.54 |
| 29-4C | 0.76 | 0.76 |
| AL6XN | 1.02 | 0.76 |

These results demonstrate that thiocyanate salts reduce the rates of corrosion of certain iron alloys by aqueous solutions of lithium and zinc bromides. In particular, the ASTM A36 and ASTM A516 carbon steels and the UNS S40900, UNS S43000 and UNS S31600 stainless steels corroded at significantly lower rates in the presence of lithium thiocyanate. As Table I indicates, the inclusion of a thiocyanate inhibitor reduced the corrosion rate of these metals by 43%, 31%, 19%, about 100%, and 71% respectively. This marked reduction in corrosion is an unexpected and beneficial result of the inclusion of a thiocyanate inhibitor in a solution of lithium and zinc bromides.

Example II

A second set of corrosion inhibition efficacy tests were carried out as follows. In these tests, the corrosion rates of compositions having various potential inhibitors were again determined by measuring the weight lost by specimens of an iron alloy exposed to these compositions. The potential inhibitors included a thiocyanate compound which is an embodiment of the present invention as well as some other additives traditionally used as corrosion inhibitors in lithium bromide compositions.

A testing fluid was chosen to approximate the characteristics (particularly the corrosivity) of the working compositions typically employed in the absorption refrigeration art. The testing solution was an aqueous 85 percent solution of lithium and zinc bromides, with a lithium bromide to zinc bromide molar ratio of 1.5:1. In each of several tests, 65 milliliters of the lithium/zinc bromide solution were placed into a 250 ml glass round bottom flask. The round bottom flask had a thermocouple well attached to a glass condenser. The condenser section was fitted with a glass tube and stopper so that nitrogen gas could be purged through the test apparatus continuously to prevent interference from oxygen.

About 500 mg/L of one of the tested inhibitors were added to the round bottom flask in each test, except for the control test with no inhibitor. The potential inhibitor tested was lithium thiocyanate according to the invention, and lithium salts of chromate, molybdate, tungstate, silicate, and nitrate, representing prior art.

Preweighed samples of the iron alloy ASTM A36 were inserted into the test apparatus. The weight and shape of each sample was selected to approximate the surface area to solution volume ratio of a commercial absorption refrigeration machine. The test apparatus was sealed and purged with nitrogen for 15 minutes. The round bottom flask was then heated to 400° F. (204° C.) for 3 hours. After each test period, the metal samples were washed off, dried and weighed. The difference in the weights of the samples before and after the testing period were used to calculate the metal corrosion rate of the composition with each potential inhibitor in units of mils (increments of 25.4 microns) per year (MPY).

The results of the tests are indicated below in Table II. These results for each of the potential inhibitors tested are expressed as the metal corrosion rate in mils penetration per year (or microns per year) at 400° F. (204° C.).

TABLE II

| | (U.S. units) | |
|---|---|---|
| Potential Inhibitor | Inhibitor Conc. mg/L | Corrosion Rate @ 400° F. mils/yr |
| Uninhibited | 0 | 1160 |
| Thiocyanate | 500 | 200 |
| Chromate | 500 | 1150 |
| Molybdate | 500 | 1090 |
| Tungstate | 500 | 1280 |
| Silicate | 500 | 1060 |
| Nitrate | 500 | 1550 |

TABLE II-continued (metric units)

| Potential Inhibitor | Inhibitor Conc. mg/L | Corrosion Rate @ 204° C. microns/yr |
|---|---|---|
| Uninhibited | 0 | 29464 |
| Thiocyanate | 500 | 5080 |
| Chromate | 500 | 29210 |
| Molybdate | 500 | 27686 |
| Tungstate | 500 | 32512 |
| Silicate | 500 | 26924 |
| Nitrate | 500 | 39370 |

These results demonstrate that thiocyanate salts are many times more effective in reducing corrosion under the conditions of this test than traditional corrosion inhibitors. In particular, the compositions having lithium thiocyanate corroded samples of iron alloy ASTM A36 at a significantly lesser rate than did compositions having chromate, molybdate, tungstate, silicate, or nitrate. As indicated in Table II, the corrosion rate in the presence of a thiocyanate compound was from about 13% to about 19% of the corrosion rate in the presence of one of the traditional inhibitors. This marked reduction in corrosion is a surprising and advantageous result of the use of a thiocyanate inhibitor rather than (or in addition to) other inhibitors.

What is claimed is:

1. A refrigerant/absorbent composition comprising an aqueous solution of at least one lithium halide, at least one zinc halide, and a corrosion inhibiting amount of thiocyanate ion.

2. The composition of claim 1 wherein the thiocyanate ion is formed by the dissociation of a thiocyanate salt.

3. The composition of claim 1, further comprising at least one calcium halide.

4. The composition of claim 1, wherein said lithium halide is lithium bromide and said zinc halide is zinc bromide.

5. The composition of claim 4, further comprising calcium bromide.

6. The composition of claim 1, wherein the amount by weight of said thiocyanate ion present in the composition is substantially less than the amount of said lithium halide present.

7. The composition of claim 2, wherein said thiocyanate salt is selected from the group consisting of sodium thiocyanate, lithium thiocyanate, potassium thiocyanate, and combinations thereof.

8. The composition of claim 2, wherein said thiocyanate salt is lithium thiocyanate.

9. The composition of claim 1 wherein said thiocyanate ion comprises from about 0.035% to about 5% by weight of said composition.

10. The composition of claim 1 wherein said thiocyanate ion comprises from about 0.09% to about 1% by weight of said composition.

11. A triple-effect absorption heat transfer machine having a working fluid in contact with metallic parts, said working fluid comprising a corrosion inhibiting amount of at least one thiocyanate salt.

12. The machine of claim 11, further comprising:
   (a) a first refrigeration loop operating within a first temperature range including a maximum temperature;
   (b) a second refrigeration loop operating within a second temperature range which has a lower maximum temperature than said maximum temperature of said first temperature range;
   (c) said first refrigeration loop having said working fluid contained therein.

13. The machine of claim 11, further comprising:
   (a) a refrigeration loop operating at a temperature range which has a minimum temperature of at least about 120° C.; and
   (d) said refrigeration loop having said working fluid contained therein.

14. The machine of claim 11, wherein said metallic parts are comprised of a material selected from the group consisting of steel, copper, and combinations thereof.

15. A process of inhibiting the corrosion of metal parts or surfaces which contact the working fluid of a triple-effect absorption heat transfer machine, wherein said process comprises incorporating in said working fluid a corrosion inhibiting amount of a thiocyanate salt.

16. The process of claim 15, further comprising the step of incorporating in said working fluid at least one lithium halide and at least one zinc halide.

* * * * *